United States Patent [19]

Reeder

[11] 4,114,910

[45] Sep. 19, 1978

[54] LATHE CHUCK ASSEMBLY FOR HOLDING UNIVERSAL JOINTS

[76] Inventor: Marion F. Reeder, 2235 N.W. 41st St., Miami, Fla. 33142

[21] Appl. No.: 788,912

[22] Filed: Apr. 19, 1977

[51] Int. Cl.² ............................................. B23B 31/10
[52] U.S. Cl. .................................. 279/123; 279/1 L; 269/268
[58] Field of Search .................... 279/123, 1 L, 17; 269/268, 270, 257; 81/186, 425 R, 425 A

[56] References Cited

U.S. PATENT DOCUMENTS

| | | | |
|---|---|---|---|
| 1,274,685 | 8/1918 | Cline | 279/123 |
| 2,708,118 | 5/1955 | Kuchenbrod | 279/123 |
| 2,894,548 | 7/1959 | Peck et al. | 269/268 X |

Primary Examiner—Gil Weidenfeld
Attorney, Agent, or Firm—Shoemaker and Mattare, Ltd.

[57] ABSTRACT

A self-centering lathe chuck assembly for positioning and holding universal joints and associated propeller shafts comprises a pair of jaw assemblies mounted for radial movement toward and away from one another and each having a concave, conically shaped member for receiving and holding a universal joint journal cross, whereby different sizes and types of universal joints can be held in a given pair of jaw assemblies and the center or axis of the journal cross is automatically aligned with the turning axis of the lathe, thus eliminating the need for a different kit or jaw assembly for each different universal joint.

6 Claims, 9 Drawing Figures

LATHE CHUCK ASSEMBLY FOR HOLDING UNIVERSAL JOINTS

BACKGROUND OF THE INVENTION

This invention relates in general to lathe chuck assemblies for positioning and holding propeller shaft universal joints for repairing, rebuilding or building propeller shaft components, using the universal joints as a mounting means.

In the prior art, many different kits are required for use on lathes to position and hold propeller shafts for working on the propeller shafts. This large number of different kits is required because of the number of different size and configured universal joint assemblies. In other words, each kit includes a journal cross with bearing caps and bearings and adaptors to adapt the particular universal joint to the lathe chuck. Since conventional lathe jaw assemblies are not constructed to hold universal joint assemblies, the kits serve as adaptors for supporting the many different universal joints and associated propeller shafts on the lathe chuck assemblies. Thus, in order for a shop to have the capability of working with a large number of different types of universal joint assemblies, the shop must stock each of the various kits for use with the respective propeller shafts, and when a particular universal joint is to be used, the kit must be assembled to the lathe chuck. This requires time, space and money. Moreover, some of the kits are relatively complex to use and require a certain degree of skill on the part of the user in order merely to position the kit for holding the universal joint and propeller shaft.

The present invention provides a unique and simple lathe chuck assembly for use in positioning and holding many different types and sizes of universal joints and associated propeller shafts. With the present invention, only one or two lathes with respective jaw assemblies are required in order to position and hold all universal joint journal crosses. There is no need to stockpile or assemble kits for holding the universal joint journal crosses, and with the lathe chuck assembly of the present invention, the universal joint journal cross is merely positioned in the modified jaw construction of the invention, whereby the universal joint journal cross is automatically centered and aligned with the lathe turning axis. There is no need to make careful measurements and adjustments in order to insure proper alignment of the universal joint journal cross axis with the lathe turning axis.

More specifically, the present invention provides a lathe chuck jaw assembly or construction which utilizes an adaptor attached to the jaw in place of the existing clamping faces on the jaw, and wherein the adaptor has a concave, conically shaped member for positioning and holding the trunions of the universal joint journal cross. According to an alternate form of the invention, a modified jaw is provided with a built-in concave, conically shaped member for engaging and holding the universal joint journal cross.

OBJECTS OF THE INVENTION

Accordingly, it is an object of this invention to provide an economical and simple lathe chuck jaw assembly for automatically positioning and holding universal joint journal crosses for working on associated propeller shaft components.

Another object of the invention is to provide a jaw construction for a lathe chuck which is adapted to engage and hold a universal joint journal cross with the axis or center of the journal cross automatically aligned with the turning axis of the lathe.

A still further object of the invention is to provide a lathe chuck adaptor assembly for attachment to a lathe chuck jaw wherein the adaptor assembly has a concave, conically shaped configuration thereon for engaging and holding the trunnions of a universal joint journal cross.

DETAILED DESCRIPTION OF THE INVENTION

Figure 1:
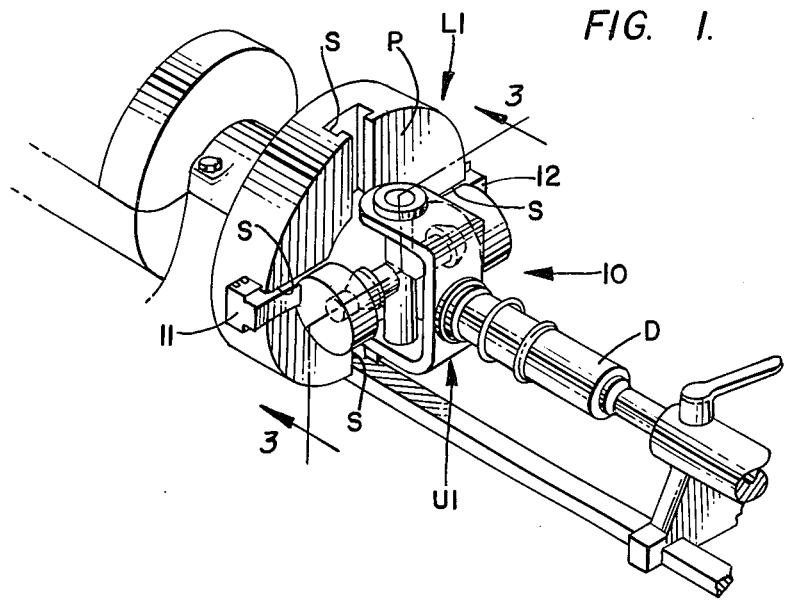
FIG. 1 is a fragmentary perspective view of a portion of a lathe having the lathe chuck assembly of the invention attached thereto and shown holding a universal joint journal cross in position for working on the associated propeller shaft.
Figure 2:
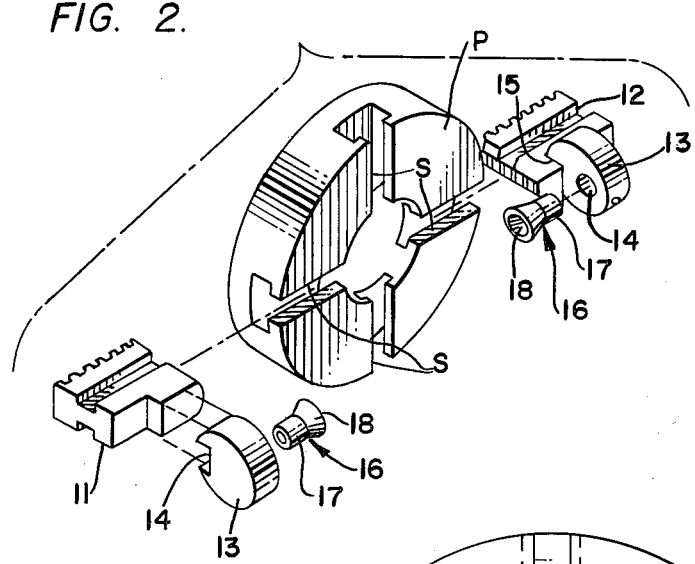
FIG. 2 is an exploded perspective view of the lathe face plate and modified jaw assemblies of the invention.
Figure 3:
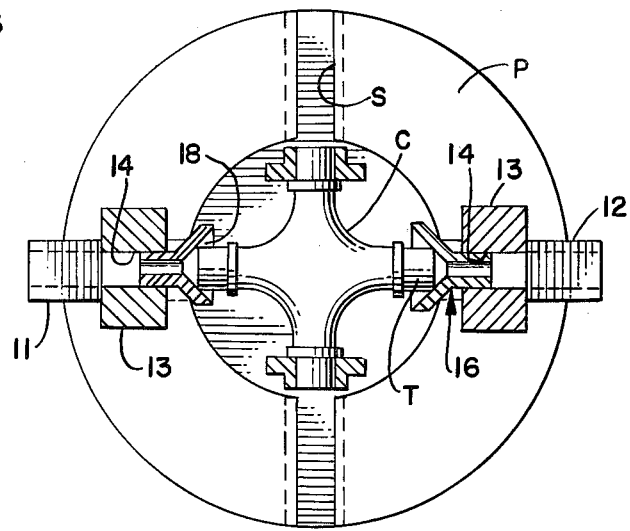
FIG. 3 is an enlarged view in section taken along line 3—3 in FIG. 1.
Figure 4:
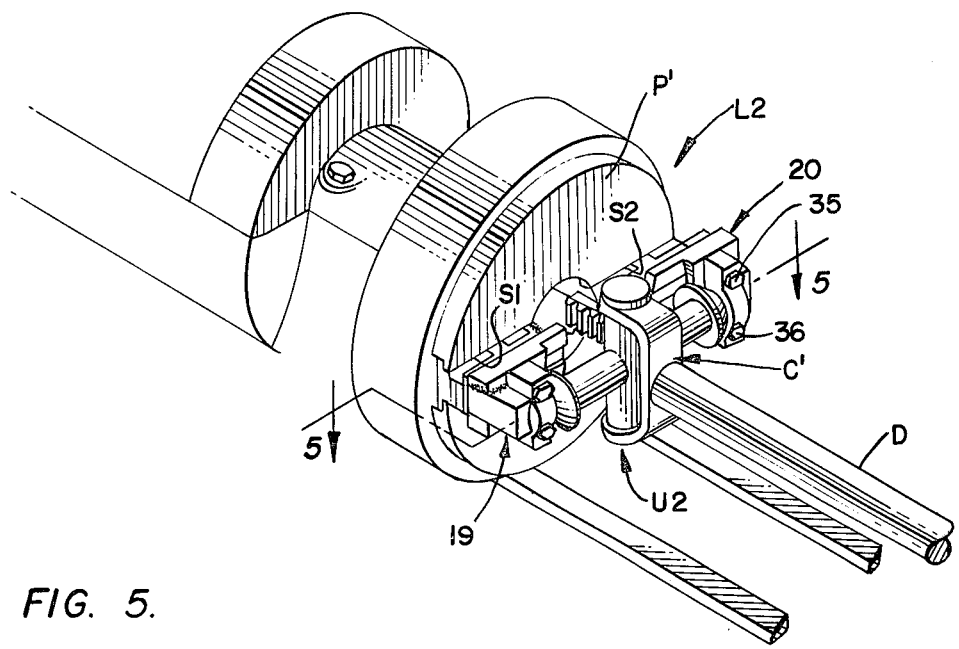
FIG. 4 is a perspective view similar to FIG. 1 of a modified form of the invention wherein the chuck jaw assembly of the invention is shown on a larger lathe for holding larger universal joint journal cross assemblies.

In the drawings, wherein like reference numerals indicate like parts throughout the several views, a first lathe $L_1$ according to the invention is illustrated in FIGS. 1–3 and comprises a face plate P having a plurality of radially extending T-shaped slots S therein for radially adjustably receiving and holding the lathe chuck jaw assembly 10 of the invention. The jaw assembly 10 in accordance with the first form of the invention comprises a pair of jaws 11 and 12 radially movable in a pair of 180° opposed slots S. Each of the jaws 11 and 12 is of substantially conventional construction, except that rather than having the conventional clamping faces thereon, a support means or base member 13 is secured to each of the jaws 11 and 12 and the base member 13 has a precision bore 14 therein. As seen best in FIG. 2, the base 13 has a slot 15 in one side thereof and the outer surface of the jaws 11 and 12 is received in the slot 15. The base member is welded to the respective jaws with the bores or sockets 14 in precise alignment with one another across the turning axis of the lathe. A pair of cone members 16 each has a cylindrical stub or extension 17 thereon received in close fitting engagement in the bores 14 of the base members 13 and each includes a concave, conically shaped enlargement or recess 18 disposed in opposing, aligned relationship for engaging and holding the trunnions T of the journal cross C of a universal joint $U_1$, whereby the axis of the universal joint $U_1$ and of the associated propeller shaft or drive shaft D are automatically positioned and aligned with the axis or center of the lathe $L_1$.

As can readily be seen in the drawings, the lathe $L_1$ in this form of the invention is a four jaw, scroll-type lathe chuck assembly and generally has a size for engaging and holding smaller articles up to a given diameter, such as, for example, about 8 inches or the like.

Figure 7:
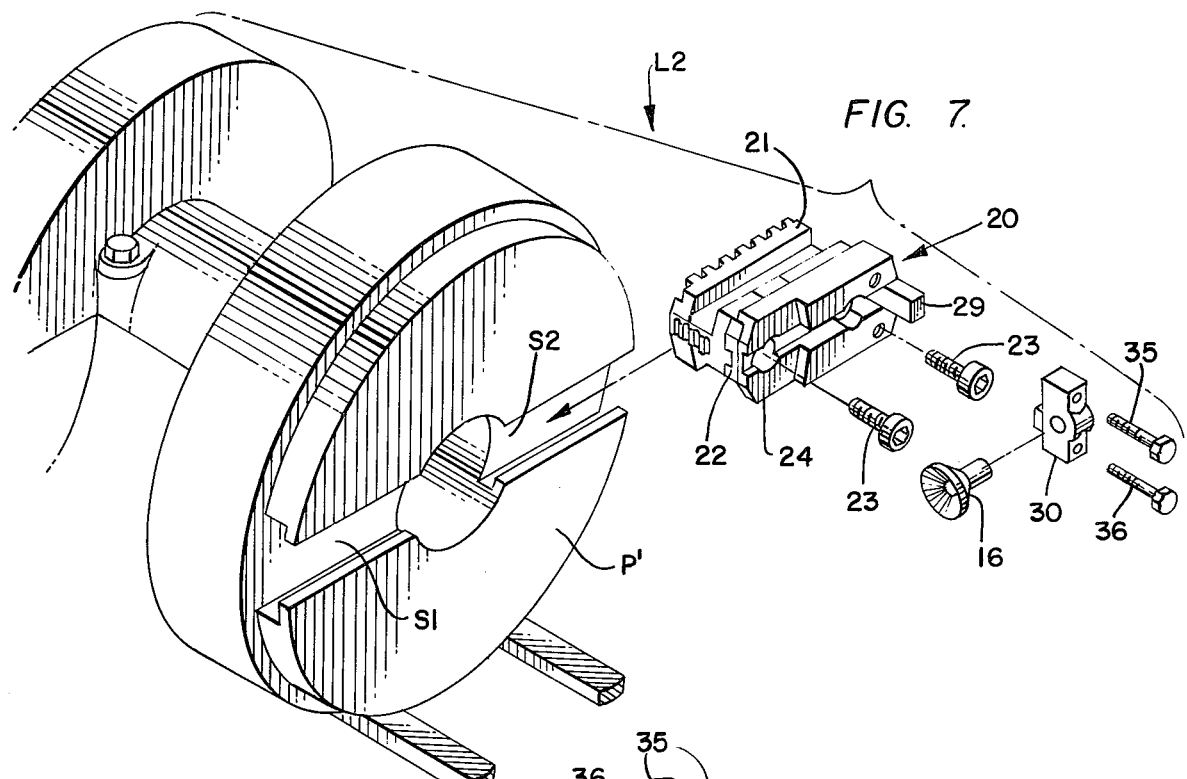
FIG. 7 is an enlarged fragmentary perspective view of the invention shown in FIG. 4, with one of the modified lathe chuck jaw assemblies removed from the face plate of the lathe.

A second form of the invention is indicated generally at $L_2$ in FIGS. 4–8, and in this form of the invention, the lathe $L_2$ is larger than the previously described lathe and is adapted for holding larger articles, i.e., those having a diameter of 8 inches and larger. For example, the lathe $L_2$ could be a three jaw lathe having three slots and associated jaws positioned 120° apart about the axis of the lathe. In this event, and for holding the universal joint journal cross, a further slot $S_2$ would be machined in the face plate P' diametrically opposite one of the slots $S_1$ and the other two slots would not be used. This is indicated in FIG. 7, for example, wherein the two unused slots are denoted in dot and dash line. Thus, while a conventional face plate could be modified for use with this form of the invention, it is also contemplated that a new or modified face plate P' with only the two opposed slots $S_1$ and $S_2$ therein could be used.

In accordance with this form of the invention, a pair of modified jaw assemblies 19 and 20 are positioned in the respective slots $S_1$ and $S_2$ for holding the cross C' of a universal joint cross assembly $U_2$, whereby the center of the cross and of the drive shaft D are aligned with the turning axis of the lathe.

Figure 5:
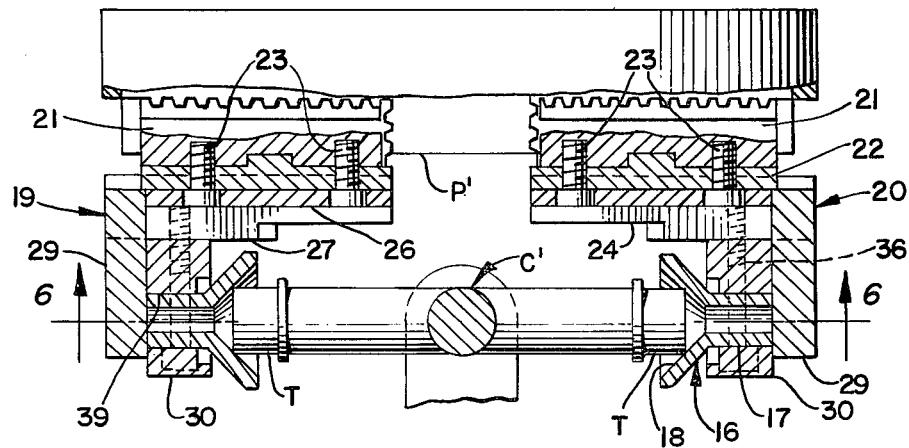
FIG. 5 is an enlarged fragmentary view in section taken along line 5—5 in FIG. 4.
Figure 6:
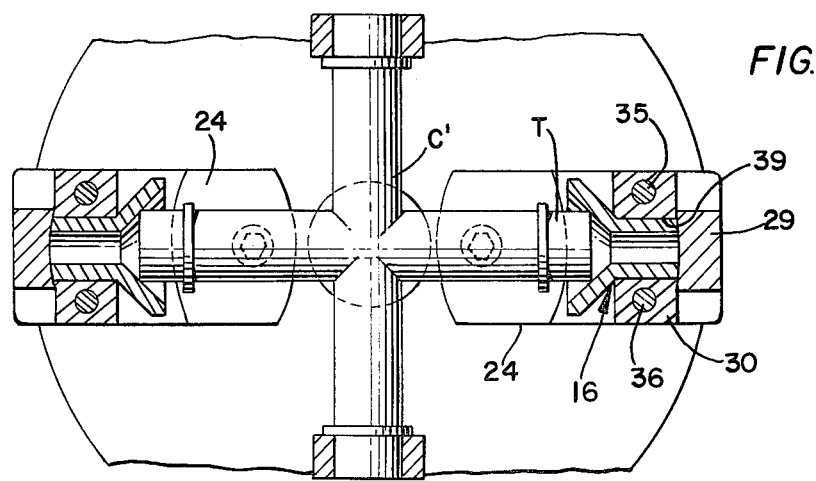
FIG. 6 is a fragmentary view in section taken along line 6—6 in FIG. 5.
Figure 8:
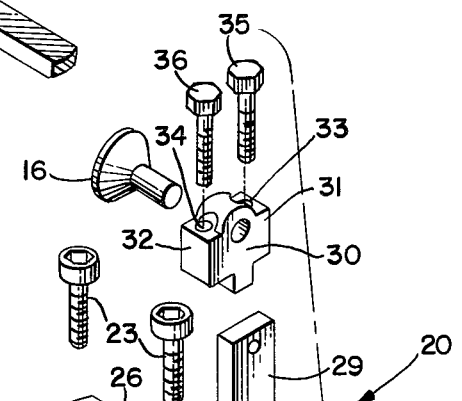
FIG. 8 is an exploded perspective view of the modified lathe chuck jaw assembly of the invention.
Figure 9:
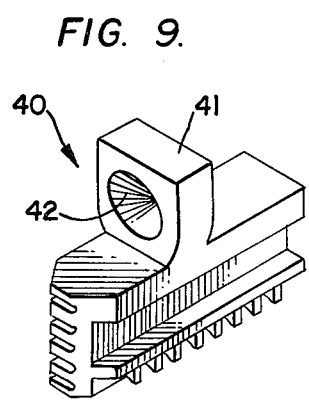
FIG. 9 is a perspective view of a third form of lathe chuck jaw assembly according to the invention.

The jaw assemblies 19 and 20 are identical in construction, and accordingly, only one will be described, description of that one sufficing for both. Referring particularly to FIGS. 5, 7 and 8, the jaw assembly 20 comprises a substantially conventional jaw 21 having a removable gripping face member 22 secured thereon, as by means of allen cap screws or the like 23 extended through aligned openings in the removable gripping face member 22 into the jaw 21. As indicated in dot and dash line in FIG. 8, one of the gripping faces F of the removable gripping face member 22 is removed for use of the jaw assembly with the present invention. A cone base member 24 having a channel or slot 25 in the underside thereof is positioned on the flat upper surface of the gripping face member 22 and the cone base member 24 may be either bolted to the gripping face member by means of the allen cap screws 23 or the like, or it may be bolted and welded to the gripping face member 22. In a preferred form of the invention, the cone base member 24 is welded to the gripping face member 22 after being accurately positioned thereon, as indicated, for example, in the drawings. The cone base member 24 has a longitudinally extending channel 26 formed in the upper surface thereof and the upper surface is stepped to define an elevated portion 27 at the rearward end of the cone base member. The rear end surface of the cone base member has a channel 28 formed therein in which is suitably secured as by welding or the like an upstanding, rectangularly shaped backing member 29. A cone receiving block 30 has oppositely extending end portions 31 and 32 with openings 33 and 34 therethrough, respectively, and the block member 30 is secured on top of the elevated portion 27 by means of a pair of bolts or the like 35 and 36 extended through the openings 33 and 34 and into aligned tapped openings 37 and 38 in the elevated portion 27. The block member 30 has an upstanding central portion with a bore or cylindrical opening 39 formed therein for snugly receiving the stub or cylindrical extension 17 of the cone member 16. The operation of this form of the invention is identical to that previously described.

Thus, as can be seen, both forms of the invention described herein make use of existing jaw members in a scroll-type lathe chuck assembly, and the universal joint journal cross holding member of the invention comprises an adaptor or attachment to the existing jaw members, whereby the trunnions of the universal joint journal crosses are engaged in conical members, such that the universal joint journal cross is automatically centered and aligned relative to the turning axis of the lathe.

If desired, a modified jaw assembly 40 may be manufactured with an integral upstanding wall 41 thereon, having a concave, conically shaped recess 42 formed therein for engaging and supporting the trunnions of the universal joint cross assembly.

Thus, with the present invention it is not necessary to stock and use a large number of different kits for use with different universal joint assemblies. Instead, conventional jaw members can be modified with the adaptor of the present invention to enable many different sizes and makes of universal joint assemblies to be used therewith. Moreover, the conventional existing gripping face of existing jaw members may be provided with a cylindrical socket or opening therein in which cone members 16 can be supported when desired or needed for holding universal joint journal cross assemblies. Thus, such jaw members would have the dual capability of holding items in a conventional manner on a lathe or the jaws could be used for holding a universal joint assembly simply by placing the cone members therein.

In one construction of the form of the invention illustrated in FIGS. 1–3, the cone members 16 are machined from tool steel and the inside or concave surfaces of the cones are suitably hardened to prevent wear of the surfaces due to contact with universal joint parts. The cone base members 13 are made by cutting two sections of suitable shafting crosswise from a steel bar or shaft. These sections are then faced and milled to receive the chuck jaws as in a key and keyway combination normally used on shafting. One faced end of the shaft sections is drilled and precision reamed to receive the cylindrical extension or stub on the cone members. In connection with the chuck jaws, it should be noted that the first step or protrusion of the jaws is ground from the jaws in line with the surface of the second step or protrusion, leaving a flat surface on the jaw parallel to the face plate of the lathe. The cone base member is then secured on this surface.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. An assembly for positioning and holding a universal joint journal cross on a lathe comprising:

a lathe face plate, having a working surface and being circular, said face plate being attached at the center thereof to a lathe turning shaft;

a pair of jaw members mounted on said face plate to be radially movable thereon and to extend outwardly from said face plate;

a pair of base members each attached to one of said jaw members to be disposed at right angles with said face plate working surface and oreinted to be in spaced parallelism with each other, said base members each having an elongate precision bore defined therein to have a longitudinal axis and to be spaced from and radially disposed with respect to said face plate, said precision bore having the longitudinal axes thereof aligned with each other and parallel with a diameter of said face plate;

a pair of universal joint journal cross member supports, each support including an elongate stub shaft received in one of said precision bores and removably secured therein to one of said base members to mount said each support on said one base member, and a pair of hollow conical frustum members each including a longitudinal axis and having the smaller base thereof integral with one end of one of said stub shafts, said frustum members having the longitudinal axes thereof aligned with the longitudinal axes of said stub shafts so that said frustum members are in longitudinal axial alignment with each other, each frustum member being disposed with the hollow portion thereof opening toward the other frustum member with the larger bases thereof being located between the smaller bases thereof;

said stub shafts being received in said precision bores and snugly supported therein to remain in axial alignment with each other thereby retaining said frustum members in longitudinal axial alignment with each other so that said pair of frustum members are oriented to receive trunnions of a universal joint journal cross in a manner which retains a central axis of the cross diametrically oriented with respect to said face plate and thereby retains such central axis diametrically oriented with respect to the turning axis of a lathe turning shaft so that the center of the cross can be aligned and retained in alignment with the turning axis of such lathe shaft.

2. The assembly as in claim 1, wherein the conical frustum members are formed in the base members and the base members are integral with the face plate.

3. The assembly as in claim 1, wherein the base members are welded to the jaw members.

4. The assembly as in claim 1, wherein the base members each includes an upstanding backing plate secured to the base member, and a block removably attached to the base member immediately adjacent the backing plate, said frustum members each being carried by the block.

5. The assembly as in claim 4, wherein the block has a cylindrical bore therein with the frustum member stub being snugly received in the bore.

6. The assembly as in claim 5, wherein the cone member comprises tool steel and the concave surface thereof which engages the universal joint journal cross trunnions is hardened to reduce wear thereof.

* * * * *